US 6,696,167 B2

(12) United States Patent
Sean et al.

(10) Patent No.: US 6,696,167 B2
(45) Date of Patent: Feb. 24, 2004

(54) MANUFACTURE OF LOW DENSITY PANELS

(75) Inventors: Sy Trek Sean, Ste-Foy (CA); Gilles Brunette, Ste-Foy (CA); Gérald Bastien, Charny (CA)

(73) Assignee: Forintek Canada Corp. (CA)

( * ) Notice: Subject to any disclaimer, the term of this patent is extended or adjusted under 35 U.S.C. 154(b) by 60 days.

(21) Appl. No.: 10/164,397

(22) Filed: Jun. 6, 2002

(65) Prior Publication Data

US 2003/0228482 A1 Dec. 11, 2003

(51) Int. Cl.⁷ ................................................. B32B 23/04
(52) U.S. Cl. ...................... 428/532; 428/535; 428/536; 428/537.1; 428/107; 428/292.4; 264/109; 264/112; 264/113; 264/120; 264/320
(58) Field of Search ................................. 264/109, 112, 264/113, 120, 320; 428/532, 535, 536, 537.1, 107, 292.4

(56) References Cited

U.S. PATENT DOCUMENTS

| 2,744,045 A | 5/1956 | Collins |
| 2,992,152 A | 7/1961 | Chapman |
| 3,061,878 A | 11/1962 | Chapman |
| 3,098,781 A | 7/1963 | Greten |
| 3,705,837 A | 12/1972 | Breslauer |
| 4,440,708 A | 4/1984 | Haataja et al. |
| 4,517,147 A | * 5/1985 | Taylor et al. .................. 264/83 |
| 5,002,713 A | 3/1991 | Palardy et al. |
| 6,129,871 A | 10/2000 | Suzuki et al. |

* cited by examiner

Primary Examiner—Leszek Kiliman
(74) Attorney, Agent, or Firm—Barnes & Thornburg

(57) ABSTRACT

Low density composite wood panels are manufactured from a feedstock comprising wood wool strands of high average slenderness ratio and high average aspect ratio, and low bulk density. The feedstock wool strands are blended with a resin binder typically in the range of 3 to 5 percent by weight and a hot wax in the range 1 to 2 percent by weight and formed into a mat. The mat is hot pressed with steam injection to effect curing of the resin. The low density panels may include on one or both of their major faces a wood veneer layer. The wood wool strands typically comprise wood of the aspen or jack pine species.

19 Claims, No Drawings

MANUFACTURE OF LOW DENSITY PANELS

FIELD OF THE INVENTION

The present invention relates to a process and apparatus using wood wool or any other ribbon lignocellulosic type material as furnish for the production of low density composite panels with improved moisture or/and water resistance. More specifically it relates to the fabrication of commercial composite panels of very low density and to the panels so produced. Furthermore, thick panel products i.e. panels with a target thickness greater than ¾ inch (19 mm) may benefit greatly from this invention.

DESCRIPTION OF THE PRIOR ART

Wood-based panel composites including oriented strand board (OSB) and medium density fibreboard (MDF) are widely employed as substitutes for solid wood in many applications. To produce wood-based composite panels, resin and wax are applied onto furnish prior to mat formation followed by hot pressing for resin curing panel consolidation. The purpose of hot pressing is first to density the panel then to provide sufficient energy to the resin to polymerise it and hence develop an effective bond for panel consolidation. The wax performs at least two important roles in the composite wood panel. Besides improving the flowability of the resin during hot pressing, the wax improves the dimensional stability of the resultant panel.

There is no doubt that the cost and speed of production of composite panel products is time and furnish dependant, and, there has been observed a significant increased interest in this subject through the advances in resin and manufacturing technologies. However wood is low in heat conductivity, limiting the heat transfer efficiency from the platen to the core of panel. Hence longer hot pressing periods are required particularly for thick panels. For example, to produce a good quality ¾ inch thick OSB panel will usually require a press cycle of more than 5 minutes.

It has been recognised that furnish compaction ratio, which is directly related to furnish bulk density, plays an important role in the mechanical properties of the finished panel. The mechanical properties of panels made from high compact ratio density are generally better than panels made from low compact ratio furnish.

It also been recognised in the art that steam is very good in heat conductivity and that the pressing time for particle board or like products can be drastically reduced by passing pressurised steam through the pressed panel, or simply by increasing the furnish moisture content. Special resins, however, are required here to prevent resin from being hydrolysed or washed-out during hot pressing.

SUMMARY OF THE INVENTION

The invention provides a method for manufacturing a low density composite wood panel, comprising:
(a) providing a feed stock comprising wood strands having the following characteristics:
an average slenderness ratio of from 200 to 800;
an average aspect ratio of from 50 to 500; and
a bulk density of from 0.08 to 0.02 grams/cm$^3$.
(b) blending said feed stock with a resin binder to provide a resinated furnish;
(c) forming said resinated furnish into a mat; and
(d) hot pressing said mat to form a finished panel.

The feed stock wood strands employed can be the waste product from the production of wood-wool for special applications in the packaging industry.

Acceptable dimensions of wood-wool average about 0.25 mm in thickness, 2 mm in width and up to 400 mm in length. This corresponds to a slenderness ratio of up to 1600, an aspect ratio of up to 200 and a bulk density of about 0.01 g/cm$^2$.

The invention also provides a low density composite wood panel comprising a furnish mat formed from wood strands having the following composition:
an average slenderness ratio of from 200 to 800;
an average aspect ratio of from 50 to 500; and
a bulk density of from 0.08 to 0.02 grams/cm$^3$;
said mat including a resin content in the range of 3–5% by weight and being hot pressed to form a finished panel. Existing wood-wool making machines can be adjusted to provide efficient control of the thickness and the width of the wood-wool strands, but, because of the strand length breakdown during processing, are unable to control the length of the strands. Thus, a screening process to separate a product wherein the strands are of a desired range of length is required. This is done by use of a vibrated screening technique and short strands that pass through the screen holes are discarded from packaging applications. The discarded waste is reclaimed, to provide strands usable for wood-wool panels and varying in length from about 15 to about 400 mm. This wide range in length of the furnish strands utilized accounts for the broad ranges expressed above in respect of the slenderness ratio, aspect ratio and bulk density.

Preferably a hot wax is added to the furnish by spraying prior to addition of the resin, the wax content being in the range 1 to 2% by weight of the furnish. As described, the purpose of wax addition in the composite wood panel is not only to improve the flowability of the resin, but, also to improve the dimensional stability of the resultant panel.

The resin content of the furnish is a function of resin type an panel type to be made. For a typically OSB it is in the range 2 to 3% by weight, and preferably for wood-wool panel it is approximately 4%. Generally speaking, the mechanical properties of the OSB panel decrease with density, and to improve product quality a higher resin content in the range 3 to 5% is preferred.

The type of resin used is a function of the end application of the panel. For exterior grade panels MDI or high molecular phenol-formaldehyde resin is preferred. Urea-formaldehyde (UF) and melamine urea-formaldehyde (MUF) are suitable for interior grade panels.

The selection of pressing technique is independent of resin type to be employed. Both pressing methods are suitable for UF, MUF, MDI and novolac PF. Therefore, because of the high humidity condition MDI or high molecular weight PF are recommended for conventional hot pressing. This may prevent resin from being hydrolysed or washed-out during hot pressing.

DESCRIPTION OF THE PREFERRED EMBODIMENTS

The invention will further be described by way of example only, in relation to the following examples. As referred to herein the bulk density of the wood-wool strands is the volume per unit weight of the uncompressed strands at atmospheric pressure. This is preferably in the range 0.008 to 0.02 grams/cm$^2$.

The furnish employed in the examples described below was reclaimed wood-wool (i.e. wood-wool discarded from the wood-wool to be used for packaging) characterised by the following specifications:

200 to 800 slenderness ratio (the ratio of length to thickness);

50 to 500 aspect ratio (ratio of length to width); and about 0.008 to 0.02 g/cm³ bulk density.

Two types of wood-wool were employed, one being made from a hard wood (aspen) having a somewhat similar density to the second which is made from a soft wood (jack pine).

Experimental panels were generally prepared as follows: reclaimed wood-wool, from industrial packaging waste, was dried to a desired target moisture content (MC), placed as a furnish into a drum-type laboratory blender where 1.5 percent of hot slack wax, based on ovendried weight, was sprayed onto the furnish, followed by the addition of resin. The resinated furnish was hand-felted into a mat where a rectangular ring of desired thickness was placed around the top periphery of the mat. The mat construction could be single or 3 layers mat. Finally, the constructed mat was placed between the two screen or caul plates prior to pressing.

a) Steam Injection Pressing Technique

The platen temperature was 210° C. and the pressing time was 160 seconds including 120 seconds of steam injection time at 150 psig of pressure and 20 seconds of steam vacuum time. The purpose of the rectangular ring referred to above mention is to seal the four edges of the panel by increasing its edges density, and, hence to systematically control the internal pressure build up during the pressing period. This approach is referred to as a "self-sealing system" and is more fully described in U.S. Pat. No. 4,850,849 Hsu assigned to the same assignee as the subject the application, and the content of which is hereby incorporated in its entirety.

For steam injection pressing, the moisture content of the furnish mat would typically be quite low, in the order of 3%, and the remainder of the moisture necessary to effect curing of the resin is provided through the injected steam.

During hot pressing, steam injected from the platens is forced to remain within the panel until the pressing operation is completed. This internal gas pressure is well controlled by panel edge density which is directly related to the thickness of the above referred to ring.

It is important to maintain the platens temperature of the press well above 100° C. to prevent condensation of steam during pressing. Typically the platens temperature is about 210° C. but platens temperature in the range of 120 to 210° C. are believed to be satisfactory.

Steam injection pressure in the range 90 to 250 psi is usually employed in the manufacture of medium density-fiberboard (MDF) and oriented strand board (OSB) panels. In the present invention because the wood-wool panel is low in density a steam pressure of about 30 psi should be sufficient to pass through the panel and cure the resin, this pressure corresponding to a saturated steam temperature of 130° C. Thus the steam injection pressure is preferably in the range 30 to 250 psi.

The pressing conditions are more dependent upon the density of the panel being made and the type of resin being used than on the panel thickness, and the ranges referred to above are suitable for forming low density wood-wool panels bonded with MUF, PF or MDI resin.

EXAMPLE 1

Boards measuring 34 in.×34 in×¾ in. with a target density of 0.53 g/cm³ (33 pcf) were fabricated with the following parameter

| resin content | 4.0% |
| --- | --- |
| furnish MC | 3.0% |
| furnish | reclaimed aspen wood-wool |

The results are presented in the first line in Table 1.

EXAMPLE 2

Boards measuring 34 in.×34 in×¾ in. with a target density of 0.41 g/cm³ (25 pcf) were fabricated with the following parameters:

| resin content | 4.0% |
| --- | --- |
| furnish MC | 3.0% |
| furnish | reclaimed aspen wood-wool |

The results are presented in the second line in Table 1.

EXAMPLE 3

Boards measuring 34 in.×34 in×¾ in. with a target density of 0.48 g/cm³ (30 pcf) were first fabricated with the following parameters:

| resin content | 4.0% |
| --- | --- |
| furnish MC | 3.0% |
| furnish | reclaimed aspen wood-wool |

These boards were then laminated with 2 plies of aspen veneer each of 1/16 inch in thickness. The results are presented in the third and fourth lines in Table 1.

EXAMPLE 4

Boards measuring 34 in.×34 in×¾ in. with a target density of 0.41 g/cm³ (25 pcf) were first fabricated with the following parameters:

| resin content | 4.0% |
| --- | --- |
| furnish MC | 3.0% |
| furnish | reclaimed aspen wood-wool |

The samples were then laminated with 2 plies of aspen veneer each of 1/16 inch thickness. The results are presented in fifth and sixth lines in Table 1.

EXAMPLE 5

Boards measuring 34 in.×34 in×7/16 in. with a target density of 0.45 g/cm³ (28 pcf) were fabricated with the following parameters:

| | |
|---|---|
| resin content | 4.0% |
| furnish MC | 3.0% |
| furnish | reclaimed jack pine wood-wool |

The results are presented in the first line in Table 2.

EXAMPLE 6

Boards measuring 34 in.×34 in×7/16 in. with a target density of 0.34 g/cm³ (21 pcf) were fabricated with the following parameters:

| | |
|---|---|
| resin content | 4.0% |
| furnish face layers MC | 3.0% |
| furnish | reclaimed jack pine wood-wool |

The results are presented in the second line in Table 2.

EXAMPLE 7

Boards measuring 34 in.×34 in×3/4 in. with a target density of 0.37 g/cm³ (23 pcf) were first fabricated with the following parameters:

| | |
|---|---|
| resin content | 4.0% |
| furnish MC | 3.0% |
| furnish | reclaimed jack pine wood-wool |

The samples were then laminated with 2 plies of aspen veneer each of 1/16 inch thickness. The results are presented in third and fourth lines in Table 2.

TABLE 1

Mechanical Properties of Wood Wool Board From Hard Wood (Aspen)

| Density g/cm³ | Internal Bonding MPa | Modulus of Elasticity Mpa | Modulus of Rupture Mpa | Thickness Swelling % | Water Uptake % | Screw Holding Face KN | Screw Holding Lateral KN |
|---|---|---|---|---|---|---|---|
| 0.54 | 0.509 | 1235 | 10.59 | 7.1 | 35.9 | 0.97 | 0.74 |
| 0.41 | 0.357 | 637 | 4.60 | 6.6 | 50 | 0.61 | 0.4 |
| 0.53+ | 0.335 | 925 | 5.19 | — | — | 1.22 | 0.88 |
| 0.53// | 0.335 | 6458 | 36.94 | — | — | — | — |
| 0.49+ | 0.444 | 323 | 5.03 | — | — | 1.03 | 0.60 |
| 0.49// | 0.444 | 8578 | 40.88 | — | — | — | — |

+overlay with veneer perpendicular direction
//overlay with veneer parallel direction

TABLE 2

Mechanical Properties of Wood Wool Board From Soft Wood (Jack Pine)

| Density g/cm³ | Internal Bonding MPa | Modulus of Elasticity Mpa | Modulus of Rupture Mpa | Thickness Swelling % | Water Uptake % | Screw Holding Face KN | Screw Holding Lateral KN |
|---|---|---|---|---|---|---|---|
| 0.45 | 0.15 | 975 | 5.1 | 7.7 | 28.3 | 0.34 | 0.33 |
| 0.34 | 0.09 | 652 | 3.1 | 5.6 | 25.2 | 0.25 | 0.31 |
| 0.39+ | 0.09 | 823 | 7.2 | — | — | 0.95 | 0.30 |
| 0.39// | 0.09 | 5920 | 34.2 | — | — | — | — |

The properties Internal bond strength (IB), modulus of rupture in bending (MOR), modulus of elasticity in bending (MOE), thickness swelling (TS) and screw holding (SH) were tested in accordance with the standard CSA CAN3-0437-93.

The binder used in the above examples can be virtually any type of commercial moisture tolerant resin, preferably novolac PF, MUF or MDI resin binder. Various waxes can be employed, but slack waxes are solid at or near room temperatures must be applied in molten form; suitable liquid waxes are preferred.

b) Conventional Pressing Technique

The key to success of conventional pressing is related to how to raise the temperature at the core of panel as fast as possible. This can be done by increasing panel internal gas pressure. Several drawback relating to the internal high gas pressure, however, been observed: for example, panel delamination, risk of explosion etc.

This invention is able to first develop a control high internal gas pressure to quickly increase the core temperature, then to avoid explosion or panel delamination by allowing the gas pressure to be efficiency released before press opening. This can also be achieved by controlling the seal at the four edges of panel, and, at the same time, decreasing the overall density of the panel. Again, similar to steam injection process, the role of the rectangular ring is to seal or to increase the density at the edges of panel, and, hence to control the internal pressure during hot pressing period. Moreover, reducing panel density creates space for the trapped steam to be freely circulated inside the panel, hence, to efficiency release the internal gas pressure.

The platen temperature used was 210° C. and the pressing time 150 seconds including a 15 second closing period and another 15 seconds opening period. Steam converted from furnish moisture is forced to remain within the panel and polymerise the resin until the pressing operation is completed.

In contrast to the steam injection process, conventional pressing conditions are more dependent upon the panel thickness and resin type being employed to make the panel rather than the panel density. In conventional pressing there is no steam injection so that a higher moisture content is required in the furnish mat typically in excess of 10% moisture by weight.

What is claimed is:

1. A method for manufacturing a low density composite wood panel, comprising:
   (a) providing a feed stock comprising wood wool strands having the following characteristics:
      an average slenderness ratio of from 200 to 800;
      an average aspect ratio of from 50 to 500; and
      a bulk density of from 0.08 to 0.02 grams/cm$^3$;
   (b) blending said feed stock with a resin binder to provide a resinated furnish;
   (c) forming said resinated furnish into a mat; and
   (d) hot pressing said mat to form a finished panel.

2. A method as claimed in claim 1 including in step (b) thereof adding a hot wax.

3. A method as claimed in claim 1 wherein said resin content is in the range 3 to 5% by weight.

4. A method as claimed in claim 2 wherein said hot wax content is in the range 1 to 2% by weight.

5. A method as claimed in claim 1 wherein said hot pressing is effected at a temperature in the range 100 to 210° C. and pressure in the range 30 to 150 psig.

6. A method as claimed in claim 1 further comprising laminating a wood veneer to opposite surfaces of said panel prior to the hot pressing step.

7. A method as claimed in claim 1 wherein said resin content is in the range from 3 to 5% by weight and said hot wax content is the range of 1 to 2% by weight.

8. A method as claimed in claim 1 wherein said resinated furnish has a moisture content of from 3 to 5% by weight sufficient to create steam during the hot pressing step to effect curing of the resin.

9. A method as claimed in claim 8 wherein a rectangular ring is employed to compress the periphery of said furnish mat during said hot pressing step to retain within the mat steam to effect curing of said resin.

10. A method as claimed in claim 1 wherein the moisture content of the furnish mat is in excess of 10% by weight.

11. A low density composite panel manufactured by the method as claimed in claim 1.

12. A low density panel as claimed in claim 11 including a wood veneer layer applied to at least one major face thereof.

13. A low density panel as claimed in claim 11 including a wood veneer layer applied to opposite major faces thereof, said wood veneer layers having grains that extend transversely with respect to one another.

14. A low density composite wood panel as claimed in claim 11 wherein said wood-wool strands are of aspen.

15. A low density composite wood panel as claimed in claim 11 wherein said wood-wool strands are of jack pine.

16. A low density composite wood panel comprising a furnish mat formed from wood strands having the following composition:
   an average slenderness ratio of from 200 to 800;
   an average aspect ratio of from 50 to 500; and
   a bulk density of from 0.08 to 0.02 grams/cm$^3$;
   said mat including a resin content in the range of 3–5% by weight and being hot pressed to form a finished panel.

17. A low density composite panel as claimed in claim 16 having a wood veneer laminated to at least one major surface thereof prior to hot pressing.

18. A low density composite wood panel as claimed in claim 16 having a wood veneer laminated to opposite major surfaces thereof prior to hot pressing.

19. A low density composite wood panel as claimed in claim 15 wherein said wood wool strands fabricated from a wood selected from aspen and jack pine.

* * * * *